(12) United States Patent
Kayumi et al.

(10) Patent No.: US 7,374,243 B2
(45) Date of Patent: May 20, 2008

(54) FOLDING SEAT APPARATUS FOR VEHICLE

(75) Inventors: Tetsuya Kayumi, Wako (JP); Hirohide Suda, Wako (JP); Koji Hashimoto, Wako (JP); Takamitsu Suzuki, Wako (JP); Daijiro Wada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 11/456,709

(22) Filed: Jul. 11, 2006

(65) Prior Publication Data

US 2007/0013218 A1    Jan. 18, 2007

(30) Foreign Application Priority Data

Jul. 14, 2005    (JP) .............. 2005-206200

(51) Int. Cl.
  *B60N 2/00* (2006.01)
  *B23Q 1/25* (2006.01)
(52) U.S. Cl. ............... 297/335; 297/341; 297/344.1; 297/463.1; 296/65.09; 296/65.13
(58) Field of Classification Search ............... 297/341, 297/335, 463.1, 344.1; 296/65.09, 65.13
See application file for complete search history.

(56) References Cited

U.S. PATENT DOCUMENTS

| | | | |
|---|---|---|---|
| 4,627,656 A | 12/1986 | Gokimoto et al. | |
| 5,195,802 A * | 3/1993 | Hayakawa et al. | 297/335 |
| 5,577,805 A | 11/1996 | Glinter et al. | |
| 5,800,015 A * | 9/1998 | Tsuchiya et al. | 297/331 |
| 6,395,691 B1 * | 5/2002 | Tsaur | 510/130 |
| 6,883,868 B2 * | 4/2005 | Yoshida | 297/331 |
| 7,293,838 B2 * | 11/2007 | Sugama et al. | 297/378.1 |

FOREIGN PATENT DOCUMENTS

| | | |
|---|---|---|
| FR | 2781435 | 1/2000 |
| JP | 2004-210009 | 7/2004 |
| WO | 96/20848 | 7/1996 |

* cited by examiner

*Primary Examiner*—Sarah B McPartlin
(74) *Attorney, Agent, or Firm*—Rankin, Hill & Clark LLP

(57) ABSTRACT

A folding seat apparatus for a vehicle comprising a slide mechanism for slidably moving a seat in a front-and-rear direction, and a pop-up mechanism for popping up a seat cushion. The slide mechanism and pop-up mechanism are connected to the control lever. The controller controls the actuator so that the control lever rotates in the forward or reverse direction. The pop-up mechanism is unlocked by rotating the control lever in a first direction, and the slide mechanism is unlocked by rotating the control lever in a second direction.

5 Claims, 12 Drawing Sheets

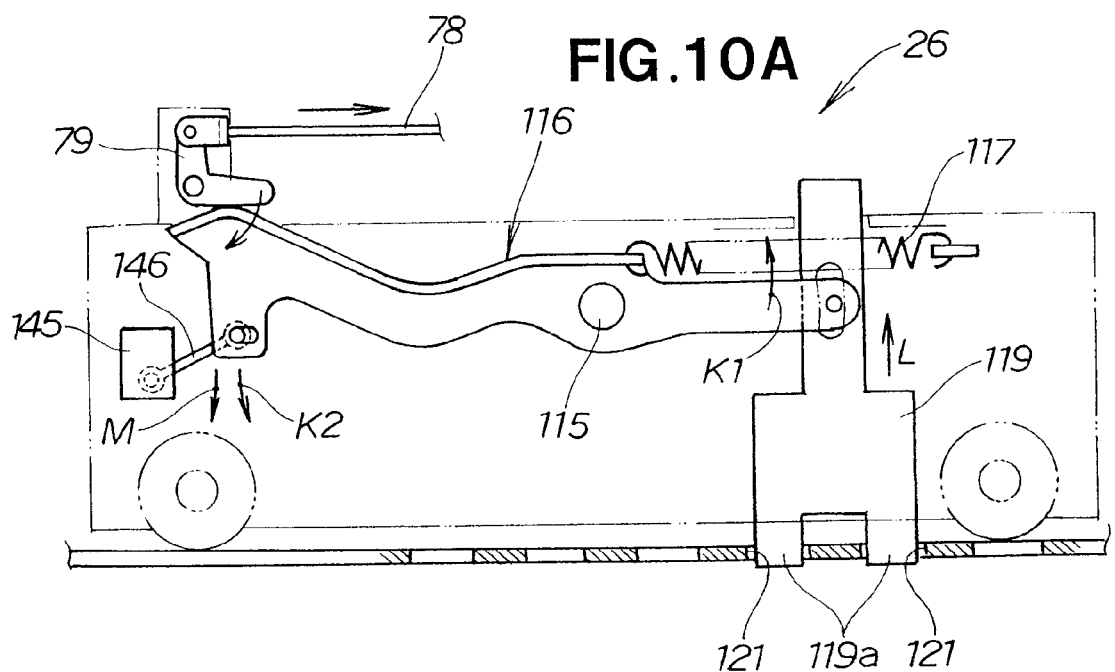
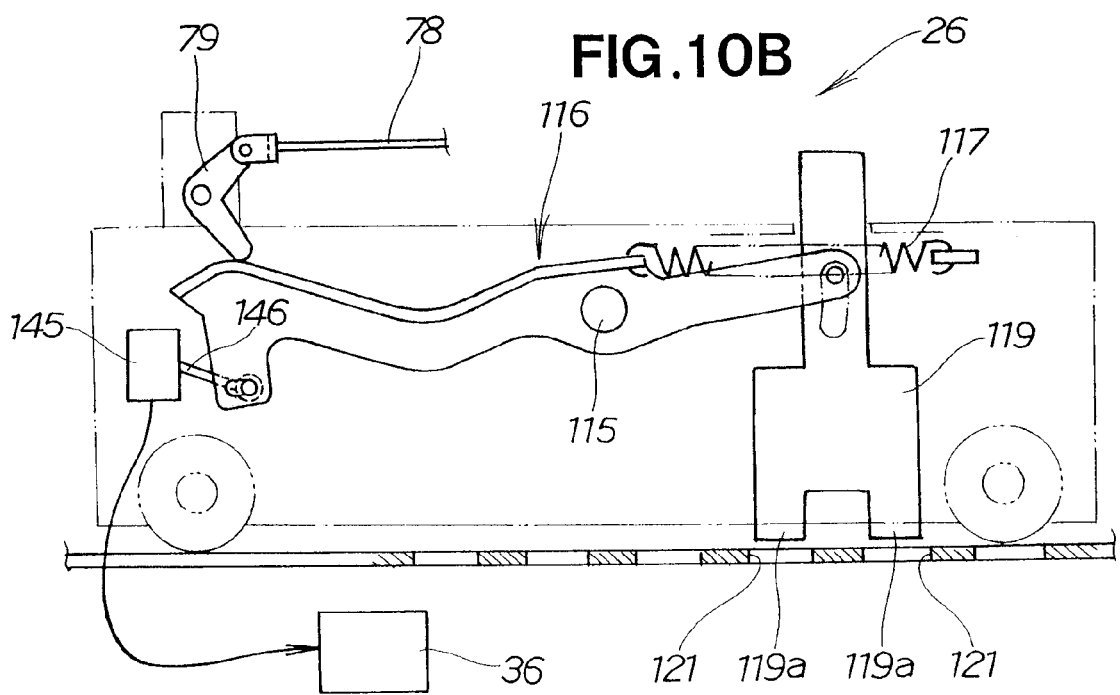

FOLDING SEAT APPARATUS FOR VEHICLE

FIELD OF THE INVENTION

The present invention relates to a folding seat apparatus that folds a seat by folding the back of a seat slidable in a front-rear direction of the vehicle and/or by folding the seat by popping up the seat cushion.

BACKGROUND OF THE INVENTION

Foldable vehicle seats for providing more vehicle interior space and facilitating the loading and unloading of passengers are known in the art.

Japanese Patent Laid-Open Publication No. 2004-210009 discloses a folding seat apparatus in which the seatback is tilted forward so as to springably reposition the seat cushion and to slidably reposition the seat.

In accordance with this seat apparatus, the reclining mechanism of the seatback is operated to unlock the seatback and tilt the seatback forward. The pop-up mechanism of the seat cushion and the slide mechanism of the seat are unlocked by tilting the seatback forward.

When the pop-up mechanism is unlocked, the seat cushion pops upward due to the spring force of a pop-up spring. The seatback and seat cushion are thereby folded into a mutually erect orientation.

The folded seat can be slidably moved toward the front of the vehicle because the slide mechanism is unlocked when the seat is tilted.

More vehicle interior space can be obtained and the loading and unloading of passengers can be facilitated by folding the seat in this manner.

However, the folding seat apparatus can potentially be made even easier to use because the reclining mechanism is manually unlocked.

It is possible to consider a method in which the seat is automatically folded as a way to make the apparatus easier to use.

In this case, when the seat is to be folded, the seatback is first tilted forward, the seat cushion pops up, and the seatback and seat cushion are folded into a mutually erect orientation.

Next, the folded seat is slidably moved in the forward direction of the vehicle.

In other words, the slide mechanism must be unlocked later than the reclining mechanism and the pop-up mechanism in order to automate the folding of the seat.

Thus, an actuator for unlocking the slide mechanism lock and an actuator for unlocking the pop-up mechanism lock must be separately provided in order to delay the unlocking of the slide lock.

For this reason, a plurality of actuators is required in order to automatically fold the seat, and this fact may become an obstacle to reducing costs and making the system more lightweight.

In view of the above, there is a need for a folding seat apparatus in which a seat can be automatically folded and the number of actuators reduced.

SUMMARY OF THE INVENTION

In an aspect, the present invention provides a folding seat apparatus for a vehicle comprising a slide mechanism for moving a seat having a seatback and a seat cushion in the front/rear direction of the vehicle; and a pop-up mechanism for popping the seat cushion upward, the apparatus further comprising a control lever connected to the slide mechanism and pop-up mechanism; an actuator for rotating the control lever in a first direction in order to unlock the pop-up mechanism, and for rotating the control lever in a second direction in order to unlock the slide mechanism; a pop-up detector for detecting that the seat cushion has popped up; and a controller for controlling the actuator so that the control lever rotates in a first direction, and controlling the actuator so as to switch the rotation of the control lever from the first direction to a second direction on the basis of a detection signal from the pop-up detector; wherein the controller controls the actuator so as to unlock the pop-up mechanism and then to unlock the slide mechanism.

The pop-up mechanism is unlocked by rotating the control lever in a first direction by using an actuator. The seat cushion is popped up by unlocking the pop-up mechanism. The pop-up detector detects that the seat cushion has popped up. The controller directs the actuator to switch the rotation of the control lever from a first direction to a second direction on the basis of a detection signal from the pop-up detector. The control lever rotates in the second direction to unlock the slide mechanism.

The seat cushion can thus be folded and the seat can then be slidably moved in a folded state by causing the slide mechanism to be unlocked later than the pop-up mechanism. The seat can thereby be prevented from interfering with the front and rear seats when the seat slidably moves partway, and the seat can be automatically moved to the desired position.

Additionally, the actuator rotates the control lever in a first direction, and the actuator then rotates the control lever, which has been rotated in a first direction, in a second direction. More specifically, the timing in the first and second directions can be offset and the control lever rotated by using a single actuator. The seat can thereby be automatically folded by using a single actuator, the number of actuators can be reduced, and a more lightweight, lower cost configuration can be assured.

Preferably, the seat apparatus further comprises a forward-tilt mechanism for tilting the seatback in the forward direction of the vehicle, wherein the control lever comprises first, second, and third branching arms connected to the forward-tilt mechanism, the pop-up mechanism, and the slide mechanism, respectively; and the pop-up mechanism is unlocked by the second branching arm, and the forward-tilt mechanism is unlocked by the first branching arm when the control lever is rotated in a first direction.

The forward-tilt mechanism, pop-up mechanism, and slide mechanism can be connected to a single control lever by providing a first, second, and third branching arm to the control lever. The number of components can thereby be further reduced by operating a large number of mechanisms, i.e., the forward-tilt mechanism, pop-up mechanism, and slide mechanism with the aid of a single control lever.

Desirably, the seat cushion is moveably disposed in the slide rails by way of a base, and the control lever is disposed on the base in order to slidably move the seat in the forward direction of the vehicle.

In a preferred form, the control lever is formed such that the first, second, and third branching arms form a Y-shape.

Desirably, the control lever is disposed on an output shaft of the actuator, and the forward-tilt mechanism, the pop-up mechanism, and the slide mechanism are connected to the first, second, and third branching arms by way of respective control cables.

BRIEF DESCRIPTION OF THE DRAWINGS

Certain preferred embodiments of the present invention will be described in detail below, by way of example only, with reference to the accompanying drawings, in which:

FIGS. 10A and 10B are diagrams showing the unlocked state of the slide mechanism;

DETAILED DESCRIPTION OF THE PREFERRED EMBODIMENTS

Figure 1:
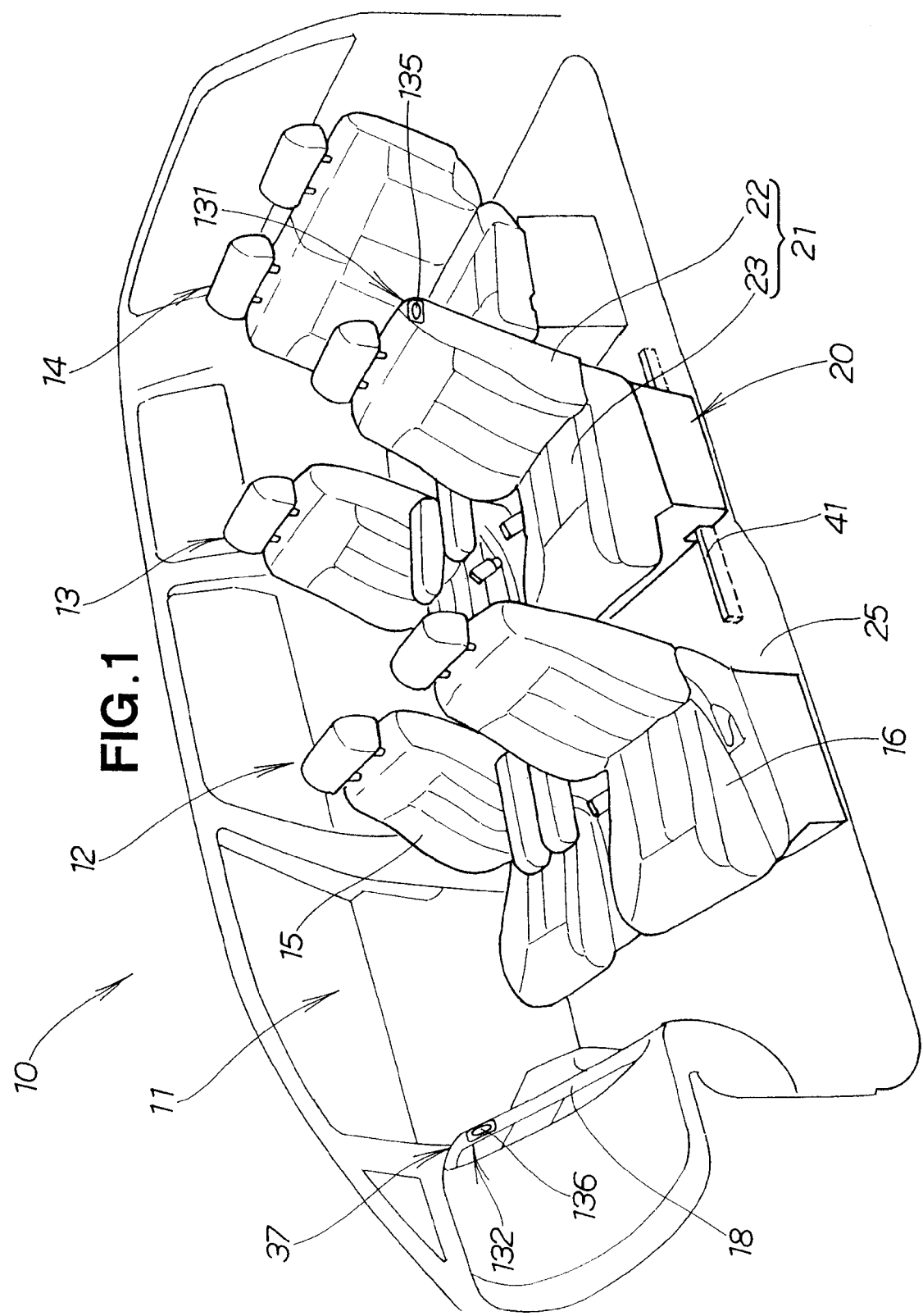
FIG. 1 is a perspective view of a vehicle provided with the folding seat apparatus according to the present invention.

The interior 11 of a vehicle 10 is provided with first row seats 12, second row seats 13, and a third row seat 14 in order from front of the vehicle to the rear of the vehicle, as shown in FIG. 1.

The first row seats 12 are provided with a right-side driver seat 15 and a left-side passenger seat 16.

The second row seats 13 are provided with seats 21 independently disposed on the left and right sides. The left-side seat 21, for example, comprises a seat unit of a folding seat apparatus 20 according to the present invention. The left-side seat 21 comprises a seat cushion 23 and a seatback 22.

The third row seat 14 is a bench-type seat.

The folding seat apparatus 20 is described below in detail with reference to FIGS. 2 to 6.

Figure 2:
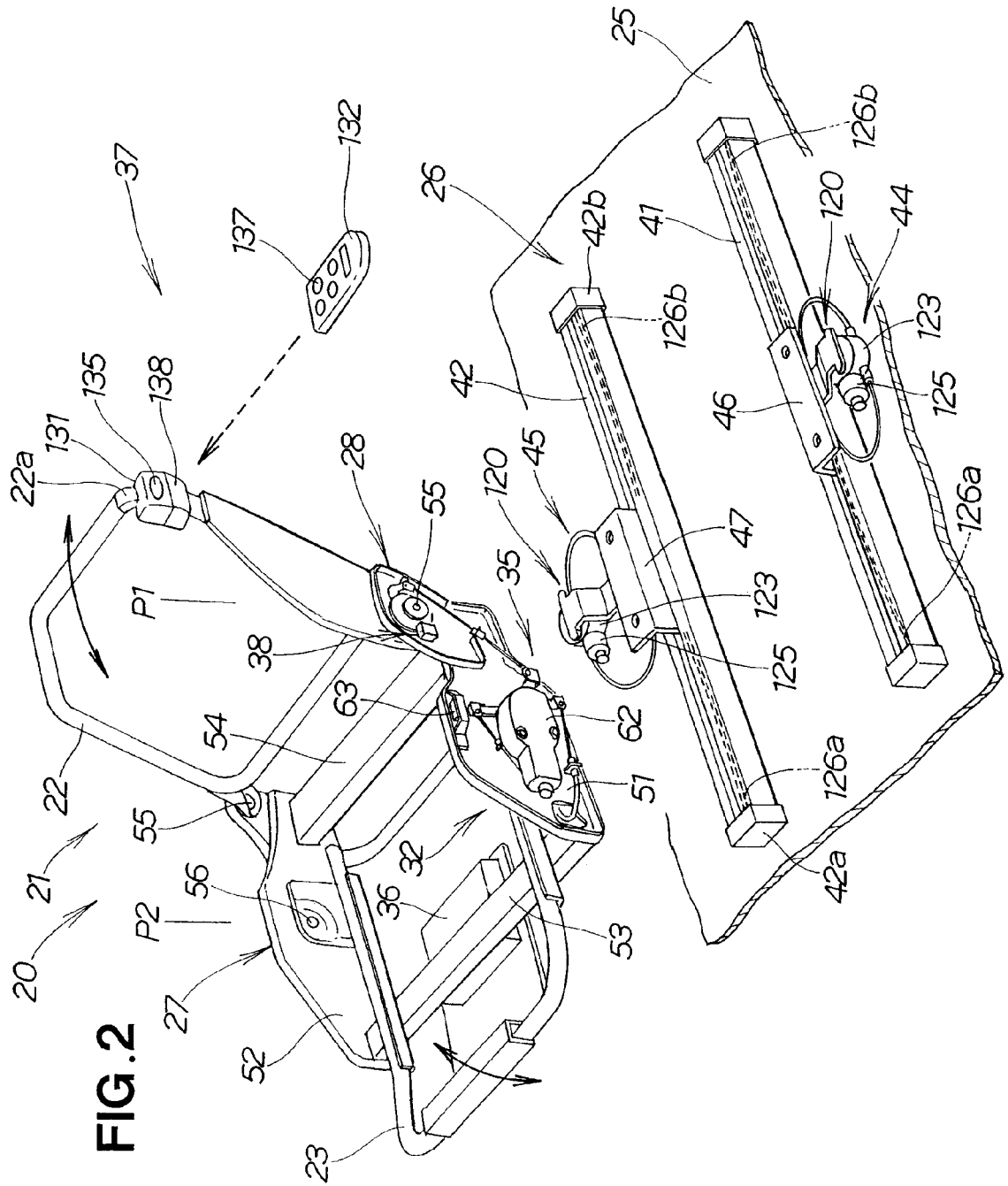
FIG. 2 is a perspective view of the folding seat apparatus according to the present invention.

FIG. 2 shows only the frame bodies of the seatback 22 and seat cushion 23 in order to clarify the configuration of the seat apparatus.

Figure 3:
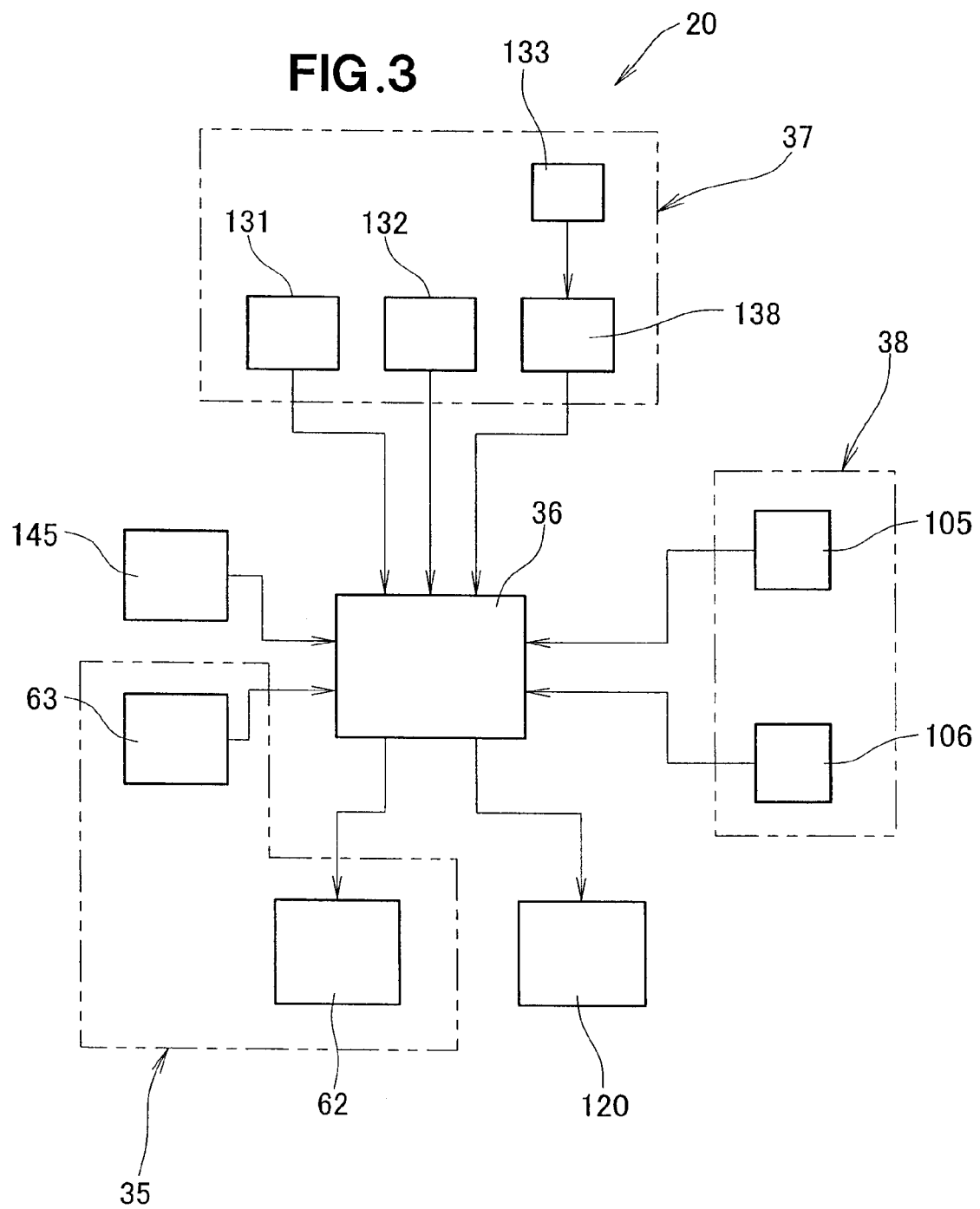
FIG. 3 is an electrical block diagram of the seat apparatus shown in FIG. 2.
Figure 4:
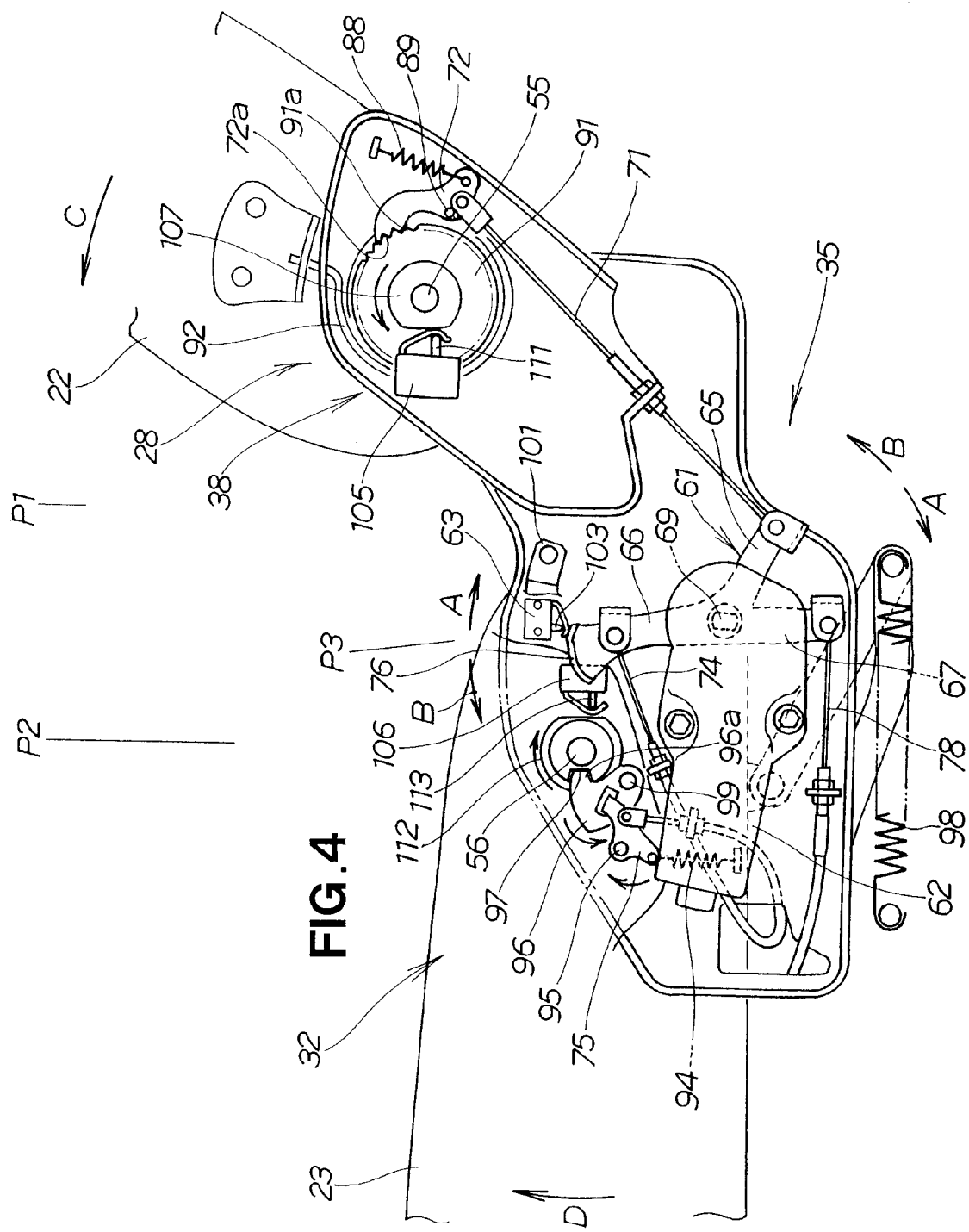
FIG. 4 is a side view of the unlocking means shown in FIG. 2.

The folding seat apparatus 20 is provided with a slide mechanism 26 disposed on the vehicle body floor 25 for sliding the seats 21 in the front/rear direction of the vehicle; a base 27 disposed on the slide mechanism 26; a seatback 22 disposed on the rear portion of the base 27 by way of the forward-tilt mechanism 28; a seat cushion 23 disposed on the base 27 by way of a pop-up mechanism 32 (see FIG. 4; an unlocking means 35 for unlocking the mechanisms 26, 28, and 32; a controller 36 for sending drive signals to the unlocking means 35; an operating means 37 for sending operation signals to the controller 36; and a detection means 38 for detecting the folded state of the seatback 22 and seat cushion 23 and sending detection signals to the controller 36, as shown in FIGS. 2 and 3.

The slide mechanism 26 has left and right slide rails 41 and 42 that are disposed on the vehicle body floor 25 and face the front/rear direction of the vehicle body, and left and right slide units 44 and 45 provided to the left and right slide rails 41 and 42, respectively.

The left slide unit 44 is provided with a left slider 46 or other component that can move in the front/rear direction of the vehicle body along the left slide rail 41.

The right slide unit 45 is provided with a right slider 47 or other component that can move in the front/rear direction of the vehicle body along the right slide rail 42.

Figure 6:
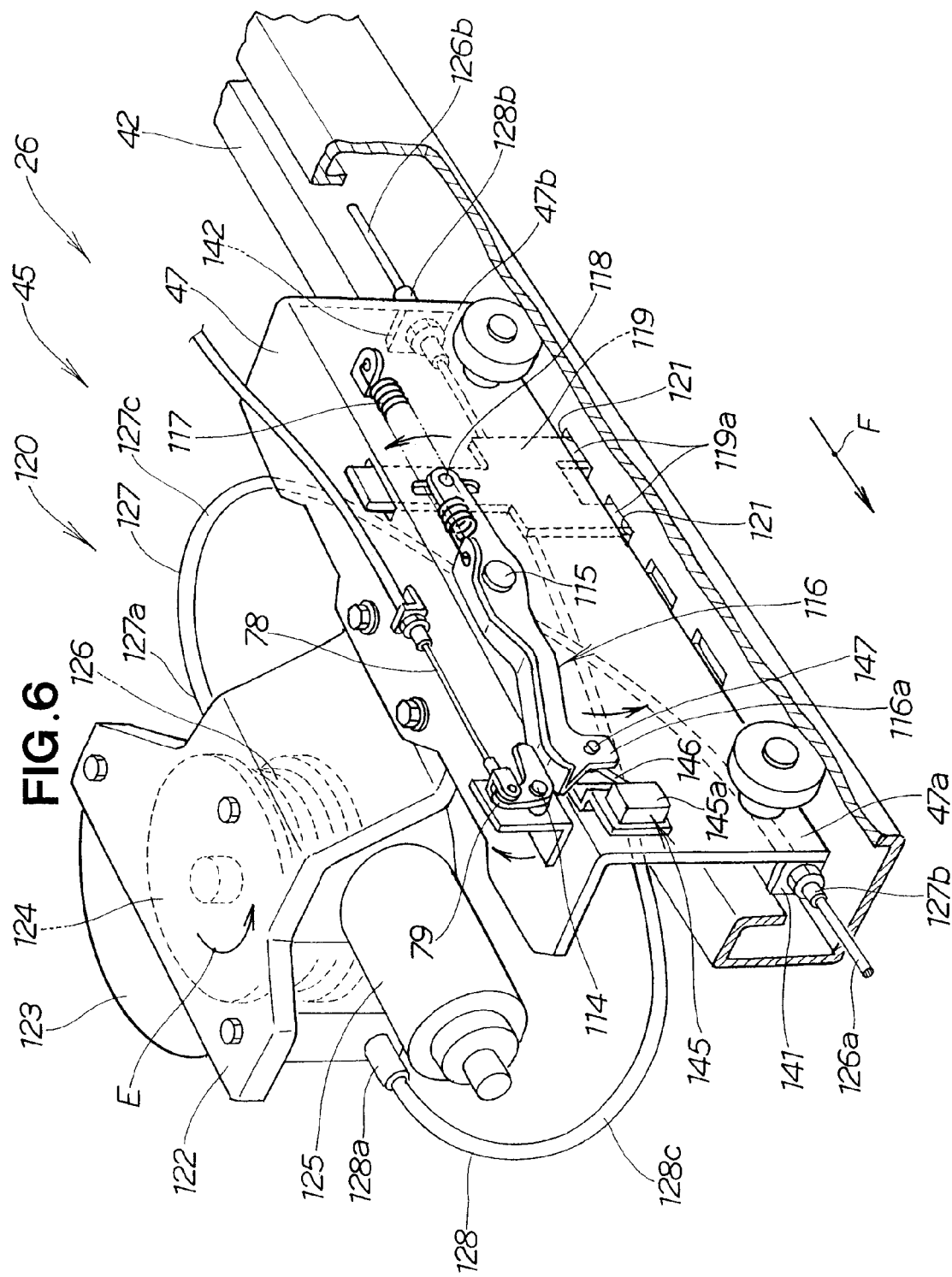
FIG. 6 is a detailed perspective view of the slide mechanism shown in FIG. 2.

The slide mechanism 26 is described in detail in FIG. 6.

The base 27 is mounted on the left and right sliders 46 and 47.

The base 27 has left and right support plates 51 and 52 whose front ends are connected by a front cross member 53, and the rear ends of the left and right support plates 51 and 52 are connected by a rear cross member 54.

The forward-tilt mechanism 28 is disposed on the rear portion of the base 27 and the pop-up mechanism 32 is disposed substantially in the center of the base 27.

The forward-tilt mechanism 28 swingably supports the seatback 22 in the arrow direction (front/rear direction of the vehicle body) by rotatably mounting the lower end of the seatback 22 on the left and right support shafts 55 and 55.

The forward-tilt mechanism 28 is a mechanism that can hold the seatback 22 in a swingably moved state as far as the folding position P1 in the forward direction of the vehicle body, and an ordinary reclining mechanism is used [for the forward-tilt mechanism].

Hereinbelow, the action of swinging the seatback 22 in the forward direction will be referred to as "forward tilt."

The pop-up mechanism 32 swingably supports the seatback 22 in the arrow direction (vertical direction) by the rotatable mounting of the seat cushion 23 on the left and right support shafts 56 and 56 (the left support shaft 56 is not depicted).

The pop-up mechanism 32 can hold the seat cushion 23 in the swung state as far as the upward folding position P2.

The unlocking means 35 for unlocking the slide mechanism 26, forward-tilt mechanism 28, and pop-up mechanism 32 is described with reference to FIGS. 4 and 5.

Figure 5:
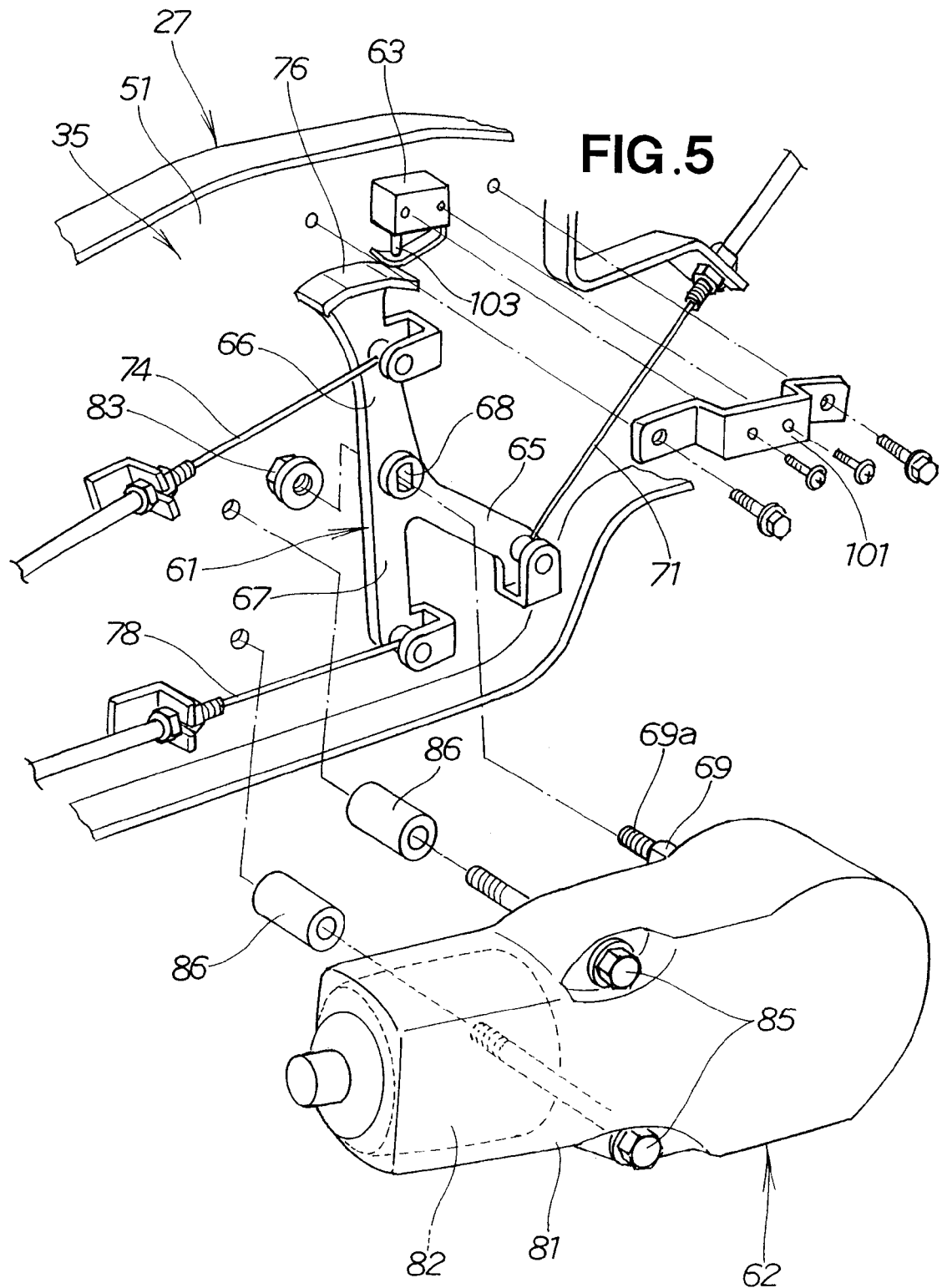
FIG. 5 is a detailed exploded perspective view of the unlocking means shown in FIG. 4.

The unlocking means 35 is provided with a control lever 61 connected to the slide mechanism 26 (see FIG. 2), forward-tilt mechanism 28, and pop-up mechanism 32; an actuator 62 for rotating the control lever 61 in the forward direction of arrow A (rotation in a first direction) and in the reverse direction of arrow B (rotation in a second direction); and a neutral-position detector 63 for detecting a neutral position P3 of the control lever 61, as shown in FIGS. 4 and 5.

The control lever 61 is formed in the shape of the character "Y" by providing first to third branching arms 65 to 67, and a mounting hole 68 is provided in the center. The mounting hole 68 is linked to an output shaft 69 of the actuator 62.

The first branching arm 65 is connected to the unlock lever 72 of the forward-tilt mechanism 28 by way of a first control cable (control cable) 71.

The second branching arm 66 is connected to the unlock lever 75 of the pop-up mechanism 32 by way of a second control cable (control cable) 74.

A substantially curved control piece 76 is provided to the distal end of the second branching arm 66. The neutral-position detector 63 is disposed above the control piece 76.

A limit switch, for example, is used as the neutral-position detector 63.

The neutral-position detector 63 is described hereinbelow.

The third branching arm 67 is connected to the slide mechanism 26 (see FIG. 6) by way of a third control cable 78.

More specifically, the third control cable 78 is forked midway and two branched cables 78 are connected to left and right unlocking levers 79 and 79 (only the left unlocking lever 79 is shown in FIG. 6), respectively, provided to the slide mechanism 26.

The third branching arm 67 is accordingly connected to the left and right unlocking levers 79 and 79 by way of the third control cable 78.

The three mechanisms, i.e., the forward-tilt mechanism 28, pop-up mechanism 32, and slide mechanism 26 can be connected to a single control lever 61 by providing the first to third branching arms 65 to 67 to the control lever 61.

The forward-tilt mechanism 28, pop-up mechanism 32, and slide mechanism 26 can thereby be controlled by the single control lever 61, and the number of components can be reduced.

The actuator 62 for operating the control lever 61, for example, houses an electric motor 82 in a casing 81; a reduction gear (not shown) is connected to the drive shaft of the electric motor 82; and the output shaft 69 of the reduction gear protrudes from the casing 81.

The control lever 61 is fixed to the output shaft 69 by fitting the mounting hole 68 of the control lever 61 on the protruding output shaft 69 and threadably fastening a nut 83 to the thread portion 69a of the output shaft 69. Accordingly, the control lever 61 integrally rotates with the output shaft 69 due to the rotation of the output shaft 69.

The actuator 62 is mounted on the left support plate 51 of the base 27 by using bolts 85 and 85. Spacers 86 and 86 are fitted on the bolts 85 and 85. Holding space is accordingly formed between the actuator 62 and the left support plate 51, and the control lever 61 is disposed in the holding space.

The actuator 62 drives and rotates the control lever 61 forward in the manner indicated by the arrow A, and the forward-tilt mechanism 28 and pop-up mechanism 32 are unlocked.

Specifically, the control lever 61 is rotated from the neutral position P3 in the forward direction indicated by the arrow A, causing the first branching arm 65 to pull the first control cable 71. The unlock lever 72 is drawn by the first control cable 71.

The unlock lever 72 resists the urging force of the spring 88 and swings about the axis of the support pin 89 in the direction of the arrow.

A stopper pawl 72a of the unlock lever 72 is separated from a notched stopper pawl 91a of the lock plate 91, and the forward-tilt mechanism 28 is unlocked.

By unlocking the forward-tilt mechanism 28, the seatback 22 is tilted forward in the direction of the arrow C by the spring force of the curled forward-tilt spring 92.

The second branching arm 66 pulls the second control cable 74 by the forward rotation of the control lever 61 from the neutral position P3 in the direction of the arrow A. The unlock lever 75 is drawn by the second control cable 74.

The unlock lever 75 resists the urging force of the spring 94 and swings about the axis of the support pin 95 in the direction of the arrow.

A lock member 96 swings in the direction of the arrow about the axis of a support pin 99 because the unlock lever 75 is connected to the lock member 96. A lock piece 96a of the lock member 96 is pulled out of the lock groove 97, and the pop-up mechanism 32 is unlocked.

By unlocking the pop-up mechanism 32, the seat cushion 23 is caused to pop upward in the manner indicated by the arrow D due to the spring force of a pop-up spring 98.

The control lever 61 is rotated forward in the direction of the arrow A to unlock the forward-tilt mechanism 28 and pop-up mechanism 32, and the forward-tilt mechanism 28 and pop-up mechanism 32 are thereafter unlocked by the reverse rotation of the control lever 61 to the neutral position P3.

Specifically, the tensile force of the first control cable 71 is released using the first branching arm 65 by the reverse rotation of the control lever 61 to the neutral position P3.

The unlock lever 72 is returned to the locked position by the urging force of the spring 88, and the forward-tilt mechanism 28 is returned to the locked state.

The tensile force of the second control cable 74 is released using the second branching arm 66 by the reverse rotation of the control lever 61 to the neutral position P3.

The lock lever 96 is returned to the locked position and the locked state of the pop-up mechanism 32 is released when the unlock lever 75 is swung to the locked position by the urging force of the spring 94.

A third control cable 78 is pulled using the third branching arm 67 by the continued rotation of the control lever 61 in the reverse direction. Left and right unlock levers 79 (see FIG. 6) are drawn by the third control cable 78.

The slide mechanism 26 (see FIG. 6) is thereby unlocked. The locked state of the slide mechanism 26 is described in detail in FIG. 6.

The above-described neutral position detector 63 will now be described.

The neutral-position detector 63 is bolted to a mounting bracket 101, and the mounting bracket 101 is bolted to the left support plate 51. The neutral-position detector 63 is thereby mounted above the second branching arm 66.

When the control lever 61 is positioned in the neutral position P3, a plunger 103 is pressed by the control piece 76 of the second branching arm 66, and the neutral-position detector 63 is kept in an ON state.

When the control lever 61 is rotated forward in the direction of the arrow A from the neutral position P3, the plunger 103 is continuously pressed by the control piece 76, and the neutral-position detector 63 is continuously kept in an ON state.

Conversely, when the control lever 61 is rotated from the neutral position P3 in the reverse direction in the direction of the arrow B, the control piece 76 is separated from the plunger 103, and the neutral-position detector 63 is kept in an OFF state.

When the neutral-position detector 63 is switched on, an ON signal is transmitted to the controller 36, and when the detector is switched off, an OFF signal is transmitted to the controller 36.

Described next is the detection means 38 for detecting that the seatback 22 has tilted and the seat cushion 23 has popped up.

The detection means 38 is provided with a forward-tilt detector 105 for detecting that the seatback 22 has tilted, and a pop-up detector 106 for detecting that the seat cushion 23 has popped up.

A limit switch, for example, is used as the forward-tilt detector 105, and the detector is mounted on the left support plate 51 of the base 27. The forward-tilt detector 105 is configured so that when the seatback 22 is tilted from the seating position (position in the diagram) to the seatback folding position P1, a cam 107 rotates together with the support shaft 55 as indicated by the arrow, and the plunger 111 is pressed by the cam 107.

The forward-tilt detector 105 is switched on, and the ON signal (detection signal) is transmitted to the controller 36 (see FIG. 3).

A limit switch, for example, is used as the pop-up detector 106, and the detector is mounted on the left support plate 51 of the base 27.

The pop-up detector 106 is configured so that when the seat cushion 23 is popped up from the seating position (position in the diagram) to the seat cushion folding position P2, a cam 112 rotates together with the support shaft 56 as indicated by the arrow, and a plunger 113 is pressed by the cam 112.

The pop-up detector 106 is switched on, and the ON signal (detection signal) is transmitted to the controller 36.

Returning to FIGS. 2 and 3, the control means 37 is provided with first to third control units (control units) 131 to 133.

A first control unit 131 is a pushbutton switch disposed on the upper end 22a of the outside portion of the seatback 22.

The seatback switch 131 is configured so as to transmit a switch-on signal (press signal) to the controller 36 when pressing force is applied to a pushbutton 135 and the switch is actuated.

The seatback switch 131 is configured so as transmit a switch-off signal (restore signal) to the controller 36 when the pressing force is released from the pressing button 135 and the switch is restored to its state prior to being pressed.

The seatback switch 131 is disposed on the upper end 22a of the outside portion of the seatback 22. The user in the vicinity of the seatback 22 can easily operate the seatback switch 131 in order to obtain loading and unloading space or meet other requirements, for example, and convenience is improved.

The second control unit 132 is a pushbutton switch disposed on the right side of an instrument panel 18 (see FIG. 1).

The instrument panel switch 132 transmits a switch-on signal (press signal) to the controller 36 when pressing force is applied to a pushbutton 136 and the switch is actuated.

The third control unit 133 is a remote control switch.

The remote control switch 133 transmits a switch-on signal (press signal) to the receiver 138 when pressing force is applied to a button 137 and the switch is actuated.

The receiver 138 transmits a switch-on signal (press signal) to the controller 36 on the basis of the received signal.

The receiver 138 is disposed below the seatback switch 131, for example.

The controller 36 controls the actuator 62 so as to rotate the control lever 61 in the forward direction on the basis of two signals, i.e., the switch-on signal (press signal) and the switch-off signal (restore signal) from the seatback switch 131.

The controller 36 controls the actuator 62 so as to rotate the control lever 61 in the forward direction on the basis of the switch-on signal from the instrument panel switch 132.

The controller 36 furthermore controls the actuator 62 so as to rotate the control lever 61 in the forward direction on the basis of the switch-on signal from the receiver 138.

Additionally, the controller 36 controls the actuator 62 so as switch the rotation of the control lever 61 from the forward rotation direction to the reverse rotation direction on the basis of the ON signals (detection signal) from the forward-tilt detector 105 and the pop-up detector 106.

The above-described slide mechanism 26 is described next with reference to FIG. 6. A symmetric arrangement is selected for the left and right slide rails 41 and 42 (see FIG. 2 for the left slide rail 41) and the left and right slide units 44 and 45 (see FIG. 2 for the left slide unit 44) provided to the slide mechanism 26.

In view of the above, the same reference numerals are used for the constituent members of the left and right slide rails 41 and 42 and the left and right slide units 44 and 45, the right slide rail 42 and right slide unit 45 are described, and a description of the left slide rail 41 and left slide unit 44 is omitted.

The right slide unit 45 shown in FIG. 6 is provided with a right slider 47 that can move in the front/rear direction of the vehicle body along the right slide rail 42. The right slider 47 is provided with a unlock lever 79, a pivot arm 116, a lock member 119, a drawing means 120, a slide start detector 145, and other components.

The unlock lever 79 is connected to the third control cable 78, and the lower end portion makes contact with the front end portion of the pivot arm 116.

The pivot arm 116 is held in the locked position when the unlock lever 79 is not drawn by the third control cable 78 (the state in FIG. 6).

In the right slide unit 45, the unlock lever 79 is drawn by way of the third control cable 78 when the control lever 61 (see FIG. 4) rotates from the neutral position P3 in the reverse direction. The unlock lever 79 thus drawn swingably moves in the manner depicted by the arrow about the axis of the support pin 114.

When the unlock lever 79 swingably moves in the manner depicted by the arrow, the pivot arm 116 in the locked position swingably moves against the spring force of the slide spring 117 in the direction of the arrow (counterclockwise direction) about the axis of the support pin 115.

The pivot arm 116 is thereby held in the unlocked position.

A locking member 119 is connected to the rear end portion of the pivot arm 116 by way of a connection pin 118. The locking member 119 rises when the pivot arm 116 swingably moves in the counterclockwise direction (arrow direction) from the locked position to the unlocked position about axis of the support pin 115.

When the locking member 119 rises, the lock pieces 119a and 119a of the locking member 119 are retracted from the locking grooves 121 and 121, and the slide mechanism 26 is unlocked.

The right slider 47 can be allowed to move along the right slide rail 42 by unlocking the slide mechanism 26 (more specifically, the right slide unit 45).

The right slider 47 has a drawing means 120 for moving the right slider 47 in the front/rear direction of the vehicle body, and a slide start detector 145 for detecting the actuation start of the drawing means.

The slide start detector 145 is an ON/OFF switch disposed near the front of the pivot arm 116.

The slide start detector 145 is configured so that the connection lever 146 extends from the detector main body 145a in the rearward direction of the vehicle body. The connection lever 146 is swingably disposed in the vertical direction on the detector main body 145a.

The end portion of the connection lever 146 is rotatably connected to the front end portion 116a of the pivot arm 116 by way of a pin 147.

The connection lever 146 is thereby caused to swingably move in the vertical direction, and the slide start detector 145 is switched on and off when the pivot arm 116 swingably moves about the axis of the support pin 115.

Specifically, the front end portion 116a of the pivot arm 116 is disposed in an upper position when the pivot arm 116 is in the locked position (diagramed position). The connection lever 146 forms an upward slope in the rearward direction of the vehicle body, and the slide start detector 145 is switched off.

On the other hand, when the pivot arm 116 is in the unlocked position, the front end portion 116a of the pivot arm 116 is disposed in a lower position. The connection lever 146 forms a downward slope in the rearward direction of the vehicle body, and the slide start detector 145 is switched on.

In this case, an ON signal is transmitted from the slide start detector 145 to the controller 36 (see FIG. 3).

The controller 36 transmits a drive signal to the drawing means 120 on the basis of the ON signal from the slide start detector 145.

Specifically, the slide start detector 145 serves to determine the actuation start of the drawing means 120.

The drawing means 120 is configured with a casing 123 disposed on the right slider 47 by way of a mounting bracket 122; a rotating drum 124 is rotatably housed in the casing 123; and an output shaft of the electric motor 125 is connected to the rotating drum 124 by way of a reduction gear and a clutch (not shown).

The electric motor 125 is mounted on the casing 123.

A rear outer cable 127 is disposed on rear side of the casing 123, and a front outer cable 128 is disposed on the front side of the casing 123.

Specifically, the rear outer cable 127 is configured so that a first end portion 127a is mounted on the rear side of the casing 123, an intermediate portion 127c is curved forward, and a second end portion 127b is extended to the front end portion 47a of the right slider 47.

The second end portion 127b is mounted facing forward on the front end portion 47a of the right slider 47 by way of a bracket 141.

The front outer cable 128 is configured so that a first end portion 128a is mounted on the front side of the casing 123, an intermediate portion 128c is curved rearward, and a second end portion 128b is extended to the rear end portion 47b of the right slider 47.

The second end portion 128b is mounted facing rearward on the rear end portion 47b of the right slider 47 by way of a bracket 142.

A cable 126 of the rotating drum 124 is insertably mounted in the rear outer cable 127 and front outer cable 128.

Specifically, a first end portion 126a side of the cable 126 wound on the rotating drum 124 is slidably inserted inside the rear outer cable 127 and is extended from the second end portion 127b of the rear outer cable 127 toward the front of the vehicle body.

The first end portion 126a of the cable 126 extended toward the front of the vehicle body is mounted on the front end 42a of the right slide rail 42 (see FIG. 2).

A second end portion 126b of the cable 126 wound on the rotating drum 124 is slidably inserted inside the front outer cable 128 and is extended from the second end portion 128b of the front outer cable 128 toward the rear of the vehicle body.

The first end portion 126b of the cable 126 extended toward the front of the vehicle body is mounted on the rear end 42b of the right slide rail 42 (see FIG. 2).

The slide mechanism 26 (more specifically, the right slide unit 45) is provided with the above-described clutch (not shown) disposed between the rotating drum 124 and the reduction gear. Intermediately disposing the clutch allows the slide mechanism 26 to be switched between automatic and manual operation.

In other words, the pivot arm 116 in the right slide unit 45 swingably moves in the counterclockwise direction to the unlocked position, and the slide start detector 145 is switched on. A signal for keeping the clutch activated and a signal for driving the electric motor 125 are transmitted from the controller 36 (see FIG. 3) on the basis of the ON signal.

The electric motor 125 is driven with the clutch in an activated state, whereby the rotating drum 124 is rotated by the electric motor 125 as indicated by the arrow E.

The first end portion 126a side of the cable 126 is accordingly wound on the rotating drum 124, and the right slider 47 slidably moves in the forward direction of the vehicle body in the manner indicated by the arrow F.

The rotating drum 124 is rotated by the electric motor 125 in the direction opposite from the arrow E, whereby the first end portion 127a side of the cable 126 is wound on the rotating drum 124.

The right slider 47 is slidably moved in a corresponding manner in the direction (rearward direction of the vehicle body) opposite from the arrow F.

The right slider 47 (i.e., seat 21 (see FIG. 2)) can thereby be automatically moved in slidable fashion in the front/rear direction of the vehicle body by using the electric motor 125.

The right slider 47 (i.e., seat 21) can be manually moved in slidable fashion in the front/rear direction of the vehicle body by deactivating the clutch, whereby the rotating drum 124 is disengaged from the electric motor 125.

A ball screw is ordinarily used as a slide mechanism for slidably moving the seat 21.

Specifically, an ordinary slide mechanism rotates a ball screw by using an electric motor to slidably move the seat along the ball screw.

In contrast, the slide mechanism 26 rotates the rotating drum 124 and winds the cable 126 in the below-described manner in order to slidably move the seat 21 (refer to FIG. 2).

The slide mechanism 26 can therefore slidably move the seat 21 more rapidly in comparison with an ordinary slide mechanism, and the noise level can be further reduced.

The folding steps of the seat 21 are described next with reference to FIGS. 7 to 12.

To facilitate the understanding of the present invention, a description is given with reference to FIGS. 7 to 12 of an example in which the seat is folded using the seatback switch 131 as a typical example of a component selected from the seatback switch 131, instrument panel switch 132, and remote control switch 133 provided as control means 37.

Figure 7:
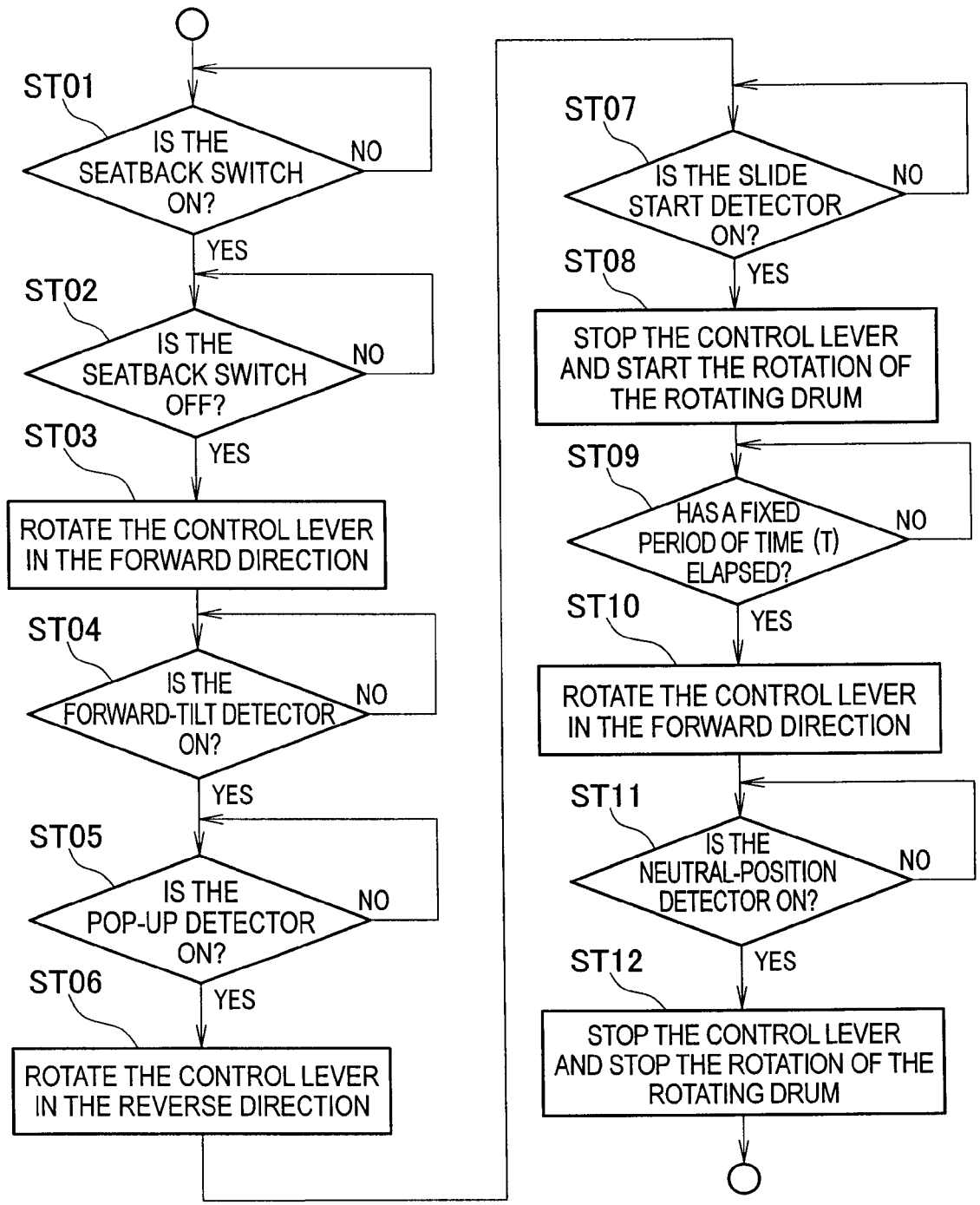
FIG. 7 is a diagram showing the control steps of the controller when the seat shown in FIG. 2 is to be folded.

First, the steps for folding the seat 21 are described on the basis of the flowchart shown in FIG. 7.

ST01: Determine whether the seatback switch 131 is switched on. If the seatback switch 131 is on, advance to ST02; otherwise return to ST01.

ST02: Confirm that the seatback switch 131 is switched on and thereafter determine whether the seatback switch 131 is switched off. If the seatback switch 131 is off, advance to ST03; otherwise return to ST02.

ST03: Transmit to the electric motor 82 a drive signal for causing the control lever 61 to rotate in the forward direction.

ST04: Determine whether the forward-tilt detector 105 is switched on. If the forward-tilt detector 105 is switched on, advance to ST05; otherwise return to ST04.

ST05: Determine whether the pop-up detector 106 is switched on. If the pop-up detector 106 is switched on, advance to ST06; otherwise return to ST05.

ST06: Transmit to the electric motor 82 a drive signal for rotating the control lever 61 in the reverse direction.

ST07: Determine whether the slide start detector 145 is switched on. If the slide start detector 145 is switched on, advance to ST08; otherwise return to ST07.

ST08: Transmit to the electric motor 82 a stop signal for stopping the control lever 61.

At the same time, transmit to the electric motor 125 a drive signal for rotating the rotating drum 124.

ST09: Determine whether a fixed time T has elapsed beginning from the time the drive signal was transmitted to the electric motor 125. If the fixed time T has elapsed, advance to ST10; and if the fixed time T has not elapsed, return to ST09.

ST10: Transmit to the electric motor 82 a drive signal for rotating the control lever 61 in the forward direction.

ST11: Determine whether the neutral-position detector 63 is switched on. If the neutral-position detector 63 is switched on, advance to ST12, otherwise return to ST11.

ST12: Transmit a stop signal to the electric motor 82 of the actuator 62 in order to stop the control lever 61 in the neutral position P3.

At the same time, transmit to the electric motor 125 a drive signal for stopping the rotating drum 124.

The steps described in FIG. 7 are described in detail with reference to FIGS. 8 to 12.

Figure 8A:
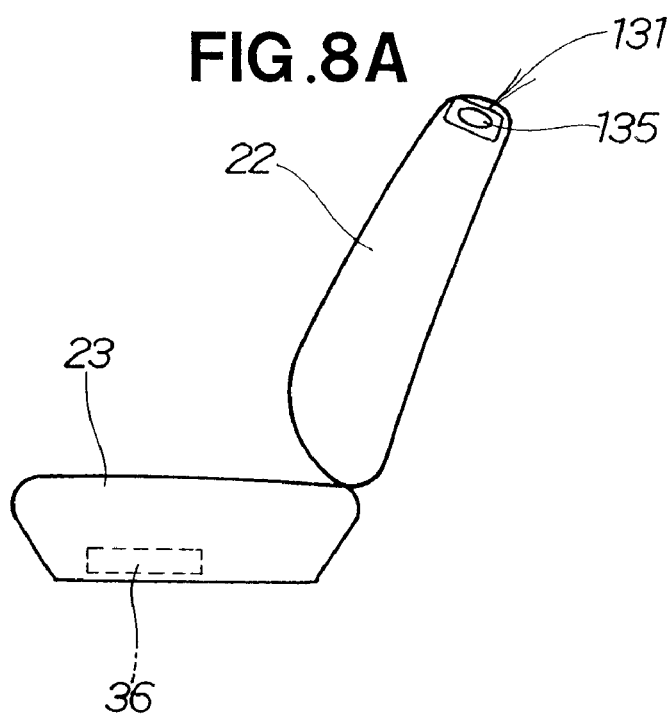
FIGS. 8A and 8B are diagrams showing the movement of the seat and control lever when the seatback switch is operated.
Figure 8B:
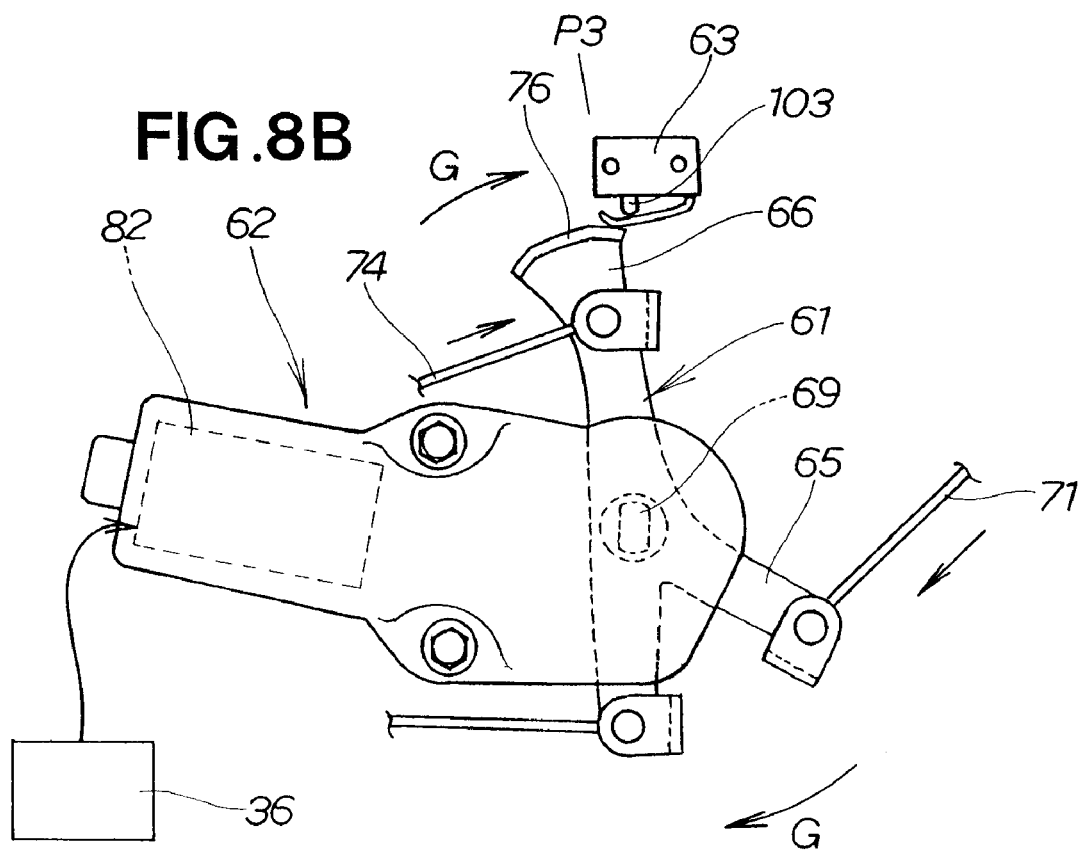

Described in detail first in FIGS. 8A and 8B are ST01 to ST03 for operating the seatback switch 131 of the folding seat apparatus 20 and rotating the control lever 61 in the forward direction.

A finger (not shown) is placed on the pushbutton 135 of the seatback switch 131 shown in FIG. 8A, and pressing force is applied to the pushbutton 135 to switch on the apparatus. A switch-on signal (press signal) is transmitted to the controller 36.

Next, the finger is removed from the pushbutton 135, and the pressing force is released from the pushbutton 135. The pushbutton 135 is restored to its state prior to being pressed, and a switch-off signal (restore signal) is transmitted to the controller 36.

In FIG. 8B, the controller 36 confirms that the switch-on signal and the switch-off signal have been sequentially transmitted, and then transmits a drive signal to the electric motor 82 of the actuator 62.

The electric motor 82 provides driving force and the control lever 61 is rotated about the axis of the output shaft 69 from the neutral position P3 in the forward direction in the manner indicated by the arrow G.

The first control cable 71 is pulled by the first branching arm 65 in the direction indicated by the arrow, and the forward-tilt mechanism 28 (see FIG. 2) is unlocked by the forward rotation of the control lever 61.

The second control cable 74 is simultaneously pulled by the second branching arm 66 in the direction indicated by the arrow, and the pop-up mechanism 32 (see FIG. 2) is unlocked.

In this case, the control piece 76 of the second branching arm 66 keeps the plunger 103 of the neutral-position detector 63 in the pressed state, as shown in FIG. 8B.

From this state, the control piece 76 of the second branching arm 66 moves in the direction indicated by the arrow G. The plunger 103 is kept pressed into the neutral-position detector 63 by the control piece 76 of the second branching arm 66, and the detector is kept switched on.

Figure 9A:
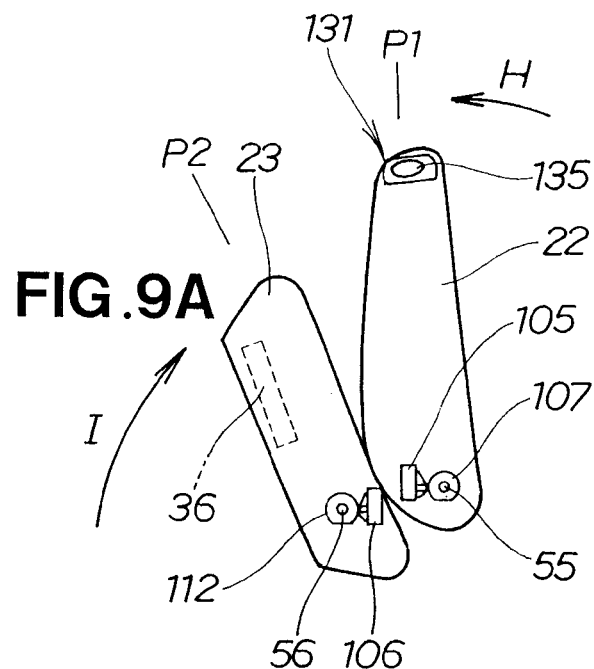
FIGS. 9A and 9B are diagrams showing the seat in its folded state.
Figure 9B:
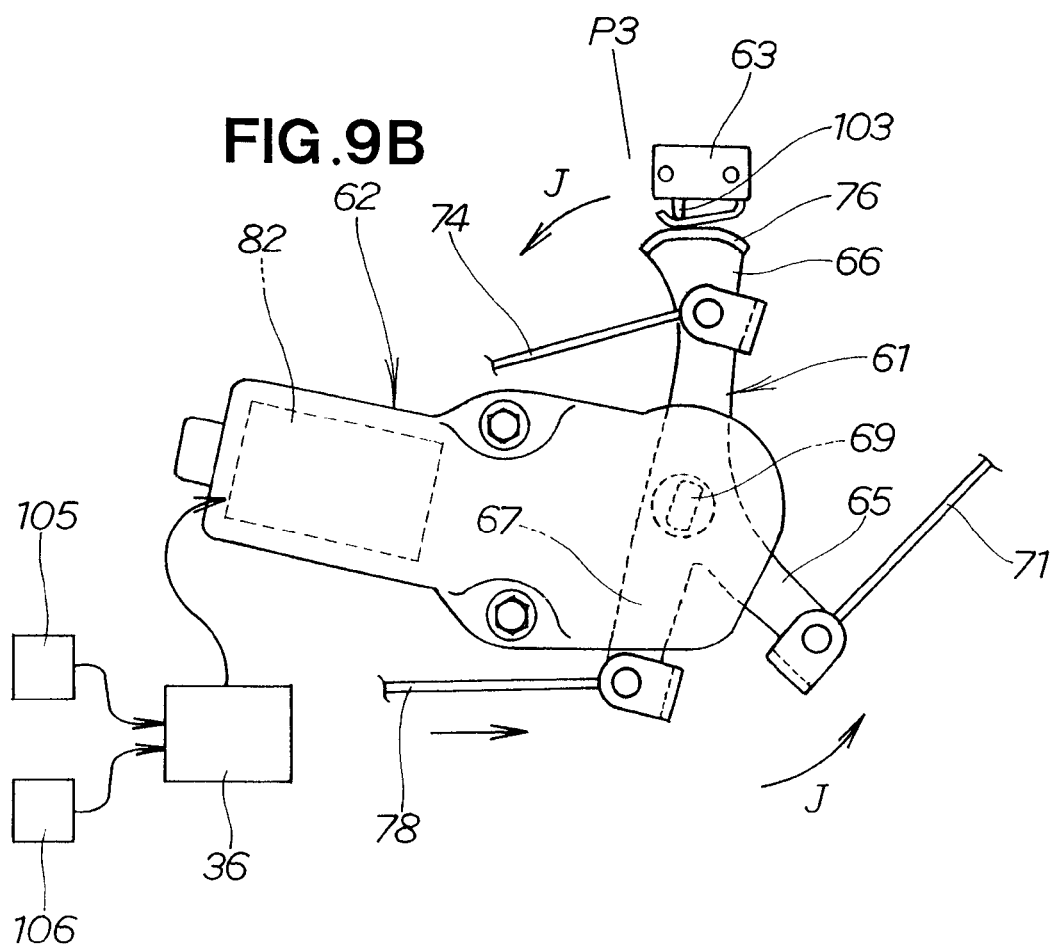

Described next in detail in FIGS. 9A and 9B are steps ST04 to ST06 for folding the seat 21 of the folding seat apparatus 20 for a vehicle.

The seatback 22 is tilted forward in the manner indicated by the arrow H, as shown in FIG. 9A, by unlocking the forward-tilt mechanism 28 (see FIG. 2) in the manner shown in FIG. 8B. The seatback 22 is tilted and held in the seatback folding position P1.

In this case, when the seatback 22 is to be tilted in the manner indicated by the arrow H, the finger is removed from the pushbutton 135 of the seatback switch 131, as shown in FIG. 8A.

The operator can thereby prevent the seatback 22 from starting to tilt while the pushbutton 135 of the seatback switch 131 is being operated, and the seatback switch 131 can be made more comfortable to operate.

With the seatback 22 tilted to the seatback folding position P1, the forward-tilt detector 105 is switched on and an ON signal (detection signal) is transmitted to the controller 36.

The seat cushion 23 is popped up in the manner indicated by the arrow I, as shown in FIG. 9A, by unlocking the pop-up mechanism 32 (see FIG. 2) as shown in FIG. 8B. The seat cushion 23 is popped up and held in the seat cushion folding position P2.

In this state, the pop-up detector 106 is switched on and an ON signal (detection signal) is transmitted to the controller 36.

In FIG. 9B, a switching signal for switching the rotational direction is transmitted from the controller 36 to the electric motor 82 of the actuator 62 on the basis of ON signals (detection signals) from the light forward-tilt detector 105 and pop-up detector 106

The control lever 61 is rotated about the output shaft 69 in the manner indicated by the arrow J by switching the rotational direction of the electric motor 82.

The tensile force of the first control cable 71 is released by the first branching arm 65, and the forward-tilt mechanism 28 (see FIG. 2) is returned to a locked state.

At the same time, the tensile force of the second control cable 74 is released by the second branching arm 66, and the pop-up mechanism 32 (see FIG. 2) is returned to a locked state.

The control lever 61 thereby continues to rotate in the reverse direction in the direction of the arrow J even after having returned to the neutral position P3.

The third control cable 78 is pulled by the third branching arm 67 in the manner indicated by the arrow.

Subsequently described in detail in FIGS. 10A and 10B is step ST07 for unlocking the slide mechanism of the folding seat apparatus 20 for a vehicle.

The unlock lever 79 is drawn by pulling the third control cable 78 in the manner indicated by the arrow, as shown in FIG. 10A.

The unlock lever 79 swingably moves in the manner indicated by the arrow, and the front end portion of the pivot arm 116 is pressed downward by the lower end portion of the unlock lever 79.

The pivot arm 116 swingably moves about the support pin 115 in the counterclockwise direction in the manner indicated by the arrows K1 and K2.

The rear end portion of the pivot arm 116 rises in the manner indicated by the arrow K1 due to the swinging movement of the pivot arm 116. The rear end portion of the pivot arm 116 rises and causes the locking member 119 to rise in the manner indicated by the arrow L.

Conversely, the front end portion of the pivot arm 116 moves downward in the manner indicated by the arrow K2 due to the swinging movement of the pivot arm 116. The front end portion of the pivot arm 116 moves downward and causes the connection lever 146 to swing downward in the manner indicated by the arrow M.

The locking member 119 rises to cause the locking pieces 119a and 119a of the locking member 119 to retract from the locking grooves 121 and 121 and unlock the slide mechanism 26, as shown in FIG. 10B.

When the connection lever 146 swings downward, the connection lever 146 forms a downward slope toward the rear of the vehicle body, and the slide start detector 145 is switched on.

An ON signal is transmitted from the slide start detector 145 to the controller 36.

Figure 11A:
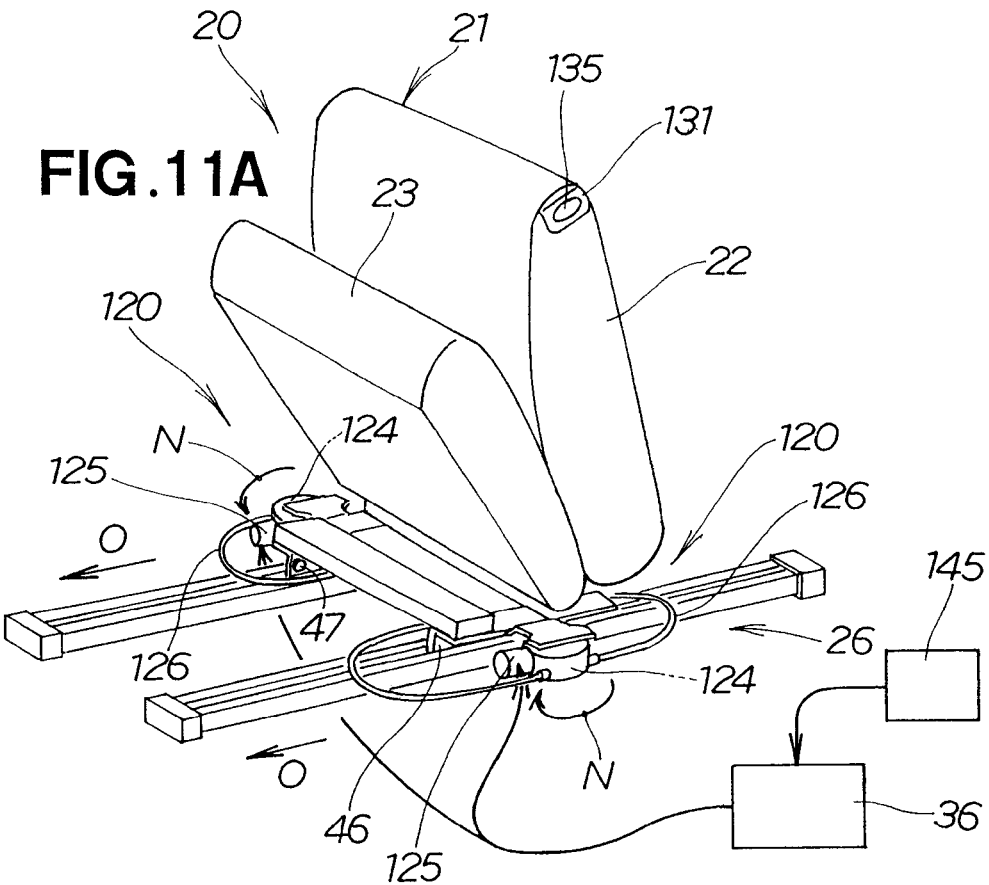
FIGS. 11A and 11B are diagrams showing the sliding movement of the folded seat in the forward direction of the vehicle.
Figure 11B:
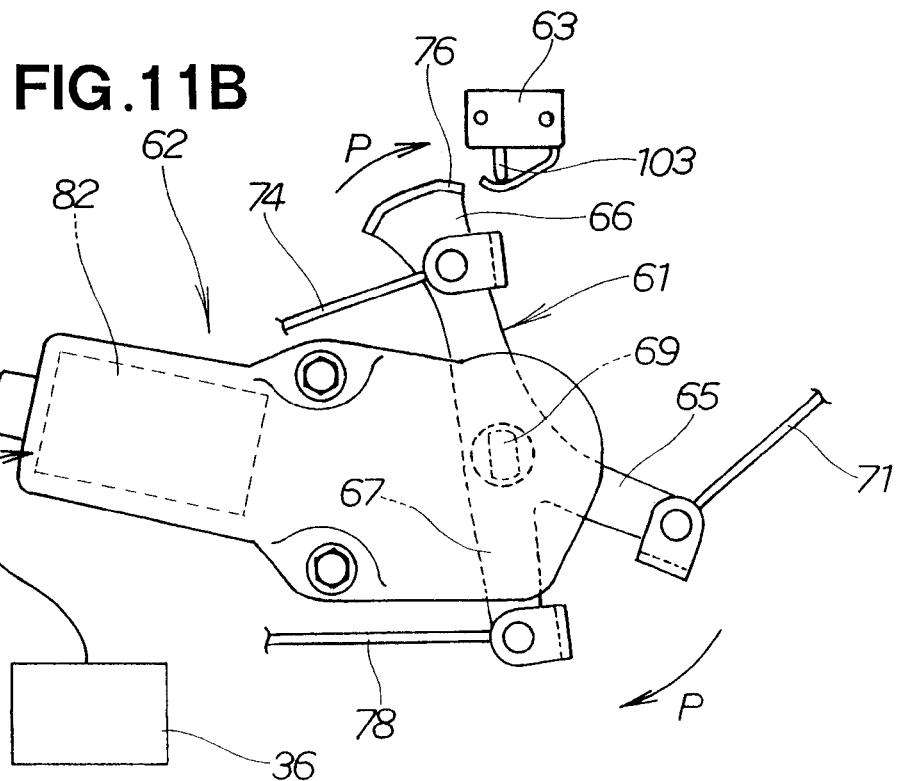

Subsequently described in detail in FIGS. 11A and 11B are steps ST08 to ST10 for sliding the seat 21 of the seat apparatus 20 in the forward direction of the vehicle body.

FIG. 11A shows the state in which the base 27 (see FIG. 2) has been removed from the seat apparatus 20 in order to facilitate the understanding of the present invention.

In FIG. 11A, a stop signal is transmitted from the controller 36 to the actuator 62 (see FIG. 9B), and a drive signal is transmitted to the left and right drawing means 120 and 120 on the basis of the ON signal transmitted from the slide start detector 145.

The electric motor 82 of the actuator 62 is stopped on the basis of the stop signal transmitted to the actuator 62. The control lever 61 (see FIG. 9B) is thereby stopped, and the slide mechanism 26 is kept unlocked.

On the other hand, the clutches (not shown) of the drawing means 120 and 120 are each connected and the electric motors 125 and 125 of the drawing means 120 and 120 are driven on the basis of the drive signals transmitted to the left and right drawing means 120 and 120.

The left and right rotating drums 124 and 124 are rotated in the manner indicated by the arrow N by the driving action of the left and right electric motors 125 and 125.

The first end portion 126a (see FIG. 2) side of the left-side cable 126 is wound on the left-side rotating drum 124, and the first end portion 126a (see FIG. 2) side of the right-side cable 126 is wound on the right-side rotating drum 124.

The left and right sliders 46 and 47 accordingly slide toward the front of the vehicle body in the manner indicated by the arrow O. The seat 21 is thereby caused to slide in the front direction of the vehicle body.

In FIG. 11B, after a fixed time T has elapsed from the start of the sliding movement of the seat 21 (see FIG. 11A), a switching signal for switching the rotational direction is transmitted from the controller 36 to the electric motor 82 of the actuator 62.

As used herein, "a fixed time T" refers to the time that begins when a drive signal is transmitted to the electric motor 125 and ends just prior to the seat 21 arriving at a slide stop position.

The control lever 61 rotates forward in the manner indicated by the arrow P by switching the rotation direction of the electric motor 82.

When the control lever 61 has started forward rotation, the control piece 76 of the second branching arm 66 is separated from the plunger 103. The pressing force of the control piece 76 is released and the plunger 103 is accordingly kept in the OFF state.

Figure 12A:
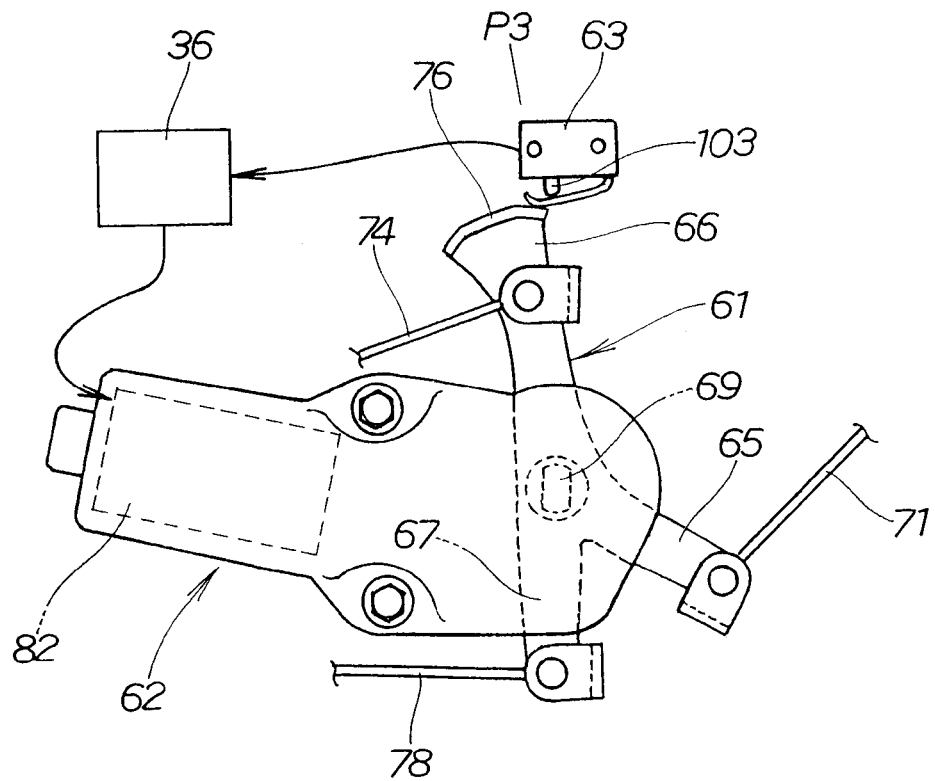
FIGS. 12A and 12B are diagrams showing the end state of the sliding movement of the folded seat in the forward direction of the vehicle.
Figure 12B:
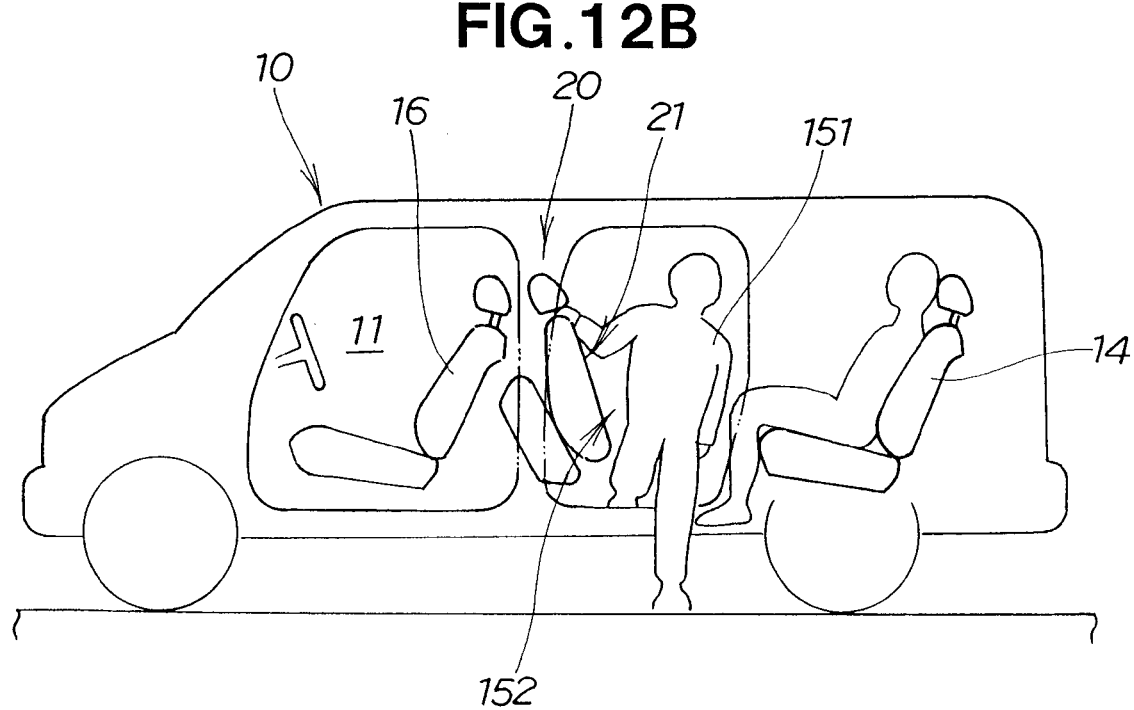

Subsequently described in detail in FIGS. 12A and 12B are steps ST11 and ST12 for folding the seat 21 in the forward direction of the vehicle body.

The control lever 61 rotates forward and arrives at the neutral position P3, as shown in FIG. 12A. At this time, the plunger 103 of the neutral-position detector 63 is pressed into the detector by the control piece 76 of the second branching arm 66.

The neutral-position detector 63 is switched on, and an ON signal is transmitted to the controller 36. A stop signal is transmitted from the controller 36 to the electric motor 82 of the actuator 62, and a stop signal is transmitted to the left and right drawing means 120 and 120 (see FIG. 11A).

The electric motor 82 of the actuator 62 is stopped based on the stop signal transmitted to the actuator 62. The control lever 61 is thereby stopped in the neutral position P3.

The electric motors 125 and 125 (see FIG. 11A) of the left and right drawing means 120 and 120 are stopped based on the stop signal transmitted to the left and right drawing means 120 and 120. The rotating drums 124 and 124 of the left and right drawing means 120 and 120 shown in FIG. 11A are therefore stopped.

Furthermore, the control lever 61 stops in the neutral position P3, whereby the tensile force of the third control cable 78 exerted by the third branching arm 67 is released. The slide mechanism 26 (see FIG. 2) is thereby returned to the locked state, and the seat 21 (FIG. 11A) is held in place.

The seat 21 is disposed behind the passenger seat 16 in a folded state, as shown in FIG. 12b. Space 152 for loading and unloading passengers 151 can thereby easily be obtained, and the passengers 151 can more easily board and exit a vehicle. The space 152 in the vehicle interior 11 can easily be increased and the ease of use can be further improved.

With reference to FIG. 12A, the forward-tilt mechanism 28, pop-up mechanism 32, and slide mechanism 26 shown in FIG. 2 can each be kept locked by stopping the control lever 61 in the neutral position P3.

The forward-tilt mechanism 28, pop-up mechanism 32, and slide mechanism 26 can be unlocked by ordinary manual operation, and can be held in any position.

Described above in FIGS. 7 to 12 is an example in which the folding operation was carried out using the seatback switch 131 of the control means 37, but instead of using the seatback switch 131, the seat 21 can be folded in the same manner by operating the instrument panel switch 132 or the remote control switch 133 of the control means 37.

As described above, in accordance with the folding seat apparatus 20 of the present invention, the control lever 61 is rotated forward by the actuator 62, whereby the forward-tilt mechanism 28 and pop-up mechanism 32 are unlocked. The forward-tilt mechanism 28 and pop-up mechanism 32 are unlocked to tilt the seatback 22 and pop up the seat cushion 23.

The forward-tilt detector 105 detects that the seatback 22 has tilted and the pop-up detector 106 detects that the seat cushion 23 has popped up.

The actuator 62 is controlled so that the rotation of the control lever 61 is switched from forward rotation to reverse rotation on the basis of detection signals from the forward-tilt detector 105 and pop-up detector 106. The control lever 61 rotates in the reverse direction to unlock the slide mechanism 26.

In this manner, the seat 21 can be made to slide while the forward-tilt mechanism 28 and the pop-up mechanism 32 are kept in a folded state by unlocking the slide mechanism 26 after the forward-tilt mechanism 28 and pop-up mechanism 32 have been unlocked.

The seat cushion 23 can thereby be prevented from interfering with the left-side passenger seat 16 when the seat 21 has slid to an intermediate point, and the seat 21 can be automatically folded.

Additionally, the control lever 61 is rotated forward by the actuator 62, and the forward rotated control lever 61 is thereafter rotated in the reverse direction by the actuator 62.

Specifically, the control lever 61 can be rotated forward and in reverse by using a single actuator 62 and offsetting the timing of the rotations.

The seat 21 can thereby be automatically folded and the number of actuators 62 can be reduced by using a single actuator 62.

An example was described in the above-described embodiment in which the forward-tilt mechanism 28 and pop-up mechanism 32 were operated by rotating the control lever 61 forward, and the slide mechanism 26 was operated by reverse rotation, but no limitation is imposed by this configuration, and a configuration is also possible in which the pop-up mechanism 32 alone is operated by the forward rotation of the control lever 61, and the slide mechanism 26 is operated by reverse rotation.

An example was described in the above-described embodiment in which the rotation of the control lever 61 in a first direction was set as forward rotation and a second direction was set as reverse rotation, but no limitation is imposed by this configuration, and the first direction of rotation can be set as reverse rotation, and rotation in the second direction can be set as forward rotation.

An example was described in the above-described embodiment in which the seat 21 was moved in the forward direction of the vehicle body, but no limitation is imposed by this configuration, and the seat 21 can be moved in the rearward direction of the vehicle body.

The above embodiment was described with reference to an example in which the forward-tilt mechanism 28 was used as the mechanism for tilting the seatback 22 forward, but no limitation is imposed by this configuration, and another forward-tilt mechanism may be used.

The above embodiment was described with reference to an example in which the pop-up mechanism 32 was used as the mechanism for popping up the seat cushion 23, but no limitation is imposed by this configuration, and another pop-up mechanism may be used.

The above embodiment was described with reference to an example in which the unlock lever 79 was used as the mechanism for unlocking the slide mechanism 26, but the unlock lever 79 is an example and no limitation is imposed thereby.

The above embodiment was described with reference to an example in which the forward-tilt detector 105 and cam 107 were used as a means for detecting the tilting of the seatback 22, but no limitation is imposed by this configuration, and another detection means may be used to detect the tilting of the seatback 22.

The above embodiment was described with reference to an example in which the pop-up detector 106 and cam 112 were used as the means for detecting that the seat cushion 23 has popped up, but no limitation is imposed by this configuration, and the popping up of the seat cushion 23 may also be detected by using another detection means.

Obviously, various minor changes and modifications of the present invention are possible in light of the above teaching. It is therefore to be understood that within the scope of the appended claims the invention may be practiced otherwise than as specifically described.

What is claimed is:

1. A folding seat apparatus for a vehicle, comprising:
a slide mechanism for moving a seat having a seatback and a seat cushion in a front-and-rear direction of the vehicle; and
a pop-up mechanism for popping the seat cushion upward,
the apparatus further comprising:
a control lever connected to the slide mechanism and pop-up mechanism;
an actuator for rotating the control lever in a first direction in order to unlock the pop-up mechanism, and for rotating the control lever in a second direction in order to unlock the slide mechanism;
a pop-up detector for detecting that the seat cushion has popped up; and
a controller for controlling the actuator such that the control lever rotates in the first direction, and controlling the actuator so as to switch the rotation of the control lever from the first direction to the second direction on the basis of a detection signal from the pop-up detector; wherein
the controller controls the actuator so as to unlock the pop-up mechanism and then to unlock the slide mechanism.

2. The seat apparatus of claim 1, further comprising a forward-tilt mechanism for tilting the seatback in the forward direction of the vehicle, wherein
the control lever comprises first, second, and third branching arms connected to the forward-tilt mechanism, the pop-up mechanism, and the slide mechanism, respectively; and
the pop-up mechanism is unlocked by the second branching arm, and the forward-tilt mechanism is unlocked by the first branching arm when the control lever is rotated in the first direction.

3. The seat apparatus of claim 1, wherein the seat cushion is moveably disposed in slide rails by way of a base, so as to slidably move the seat in the forward direction of the vehicle, and the control lever is disposed on the base.

4. The seat apparatus of claim 2, wherein the control lever is formed so that the first, second, and third arms form a Y-shape.

5. The seat apparatus of claim 2, wherein the control lever is disposed on an output shaft of the actuator, and the forward-tilt mechanism, the pop-up mechanism, and the slide mechanism are connected to the first, second, and third branching arms by way of control cables, respectively.

* * * * *